US012581341B2

(12) United States Patent (10) Patent No.: US 12,581,341 B2
Wang et al. (45) Date of Patent: Mar. 17, 2026

(54) APPARATUS AND METHOD FOR ASSISTANCE INFORMATION TRANSMISSION AND CSI REPORTING

(71) Applicant: MEDIATEK INC., Hsin-Chu (TW)

(72) Inventors: Chien-Yi Wang, Hsin-Chu (TW);
Jiann-Ching Guey, Hsin-Chu (TW);
Lung-Sheng Tsai, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 714 days.

(21) Appl. No.: 17/947,723

(22) Filed: Sep. 19, 2022

(65) Prior Publication Data

US 2023/0110955 A1 Apr. 13, 2023

Related U.S. Application Data

(60) Provisional application No. 63/254,602, filed on Oct. 12, 2021.

(51) Int. Cl.
*H04W 24/10* (2009.01)
*H04B 17/345* (2015.01)

(52) U.S. Cl.
CPC .......... *H04W 24/10* (2013.01); *H04B 17/345* (2015.01)

(58) Field of Classification Search
CPC ...................................................... H04W 24/10
See application file for complete search history.

(56) References Cited

U.S. PATENT DOCUMENTS

| | | | | |
|---|---|---|---|---|
| 2013/0077596 A1* | 3/2013 | Liang | ................... | H04L 1/1671 |
| | | | | 370/329 |
| 2015/0017998 A1* | 1/2015 | Koskinen | ............ | H04W 72/543 |
| | | | | 455/450 |
| 2015/0049706 A1 | 2/2015 | Lee | | |
| 2015/0201346 A1 | 7/2015 | Wu et al. | .............. | H04W 24/10 |
| 2015/0312789 A1* | 10/2015 | You | ........................ | H04W 24/10 |
| | | | | 370/252 |
| 2016/0359538 A1* | 12/2016 | Onggosanusi | ....... | H04B 7/0478 |
| 2020/0029315 A1 | 1/2020 | Lin | ........................ | H04W 72/04 |

(Continued)

FOREIGN PATENT DOCUMENTS

| | | |
|---|---|---|
| CN | 107317646 A | 11/2017 |
| CN | 112425246 A1 | 7/2019 |
| WO | 2021092878 A1 | 5/2021 |

OTHER PUBLICATIONS

Taiwan IP Office, search report and OA for application 111138427, mailed on Mar. 31, 2023 (6 pages). No English translation is available.

(Continued)

*Primary Examiner* — Pamit Kaur

(74) *Attorney, Agent, or Firm* — Helen Mao; Zheng Jin; Imperium Patent Works

(57) ABSTRACT

Apparatus and method for assistance information transmission and CSI reporting are proposed. The network node may allocate channel state information (CSI) configuration for the UE and transmit the CSI configuration to the UE. The UE may perform CSI measurement based on the CSI configuration from the network node, determine the assistance information based on the CSI measurement result, and transmit the assistance information the network node to improve the downlink (DL) throughput and save the signaling overhead of CSI measurement or CSI reporting.

19 Claims, 6 Drawing Sheets

CONFIGURE A FIRST PERIODIC VALUE CORRESPONDING TO A NORMAL MODE AND A SECOND PERIODIC VALUE CORRESPONDING TO AN AGGRESSIVE MODE FOR A CSI REPORTING CONFIGURATION TO A UE ⎯⎯601

RECEIVING A CSI REPORT FORM THE UE BASED ON THE NORMAL MODE OR THE AGGRESSIVE MODE ⎯⎯602

(56) References Cited

U.S. PATENT DOCUMENTS

| 2020/0178338 | A1* | 6/2020 | Ahn | .................... | H04W 74/006 |
|---|---|---|---|---|---|
| 2023/0076705 | A1* | 3/2023 | Elshafie | ................ | H04W 24/10 |
| 2023/0081579 | A1* | 3/2023 | Elshafie | ................ | H04L 5/0051 |
| | | | | | 370/329 |
| 2023/0097142 | A1* | 3/2023 | Alfarhan | .............. | H04B 17/318 |
| | | | | | 370/329 |

OTHER PUBLICATIONS

China Intellectual Property Office Action 202211218519.8 Dated Aug. 15, 2025 (No English Translation available).

* cited by examiner

| Codepoint | Interpretation |
|-----------|----------------|
| 0 | not confident |
| 1 | confident |

FIG. 4A

| Codepoint | Confidence Level |
|-----------|------------------|
| 0 | 0 |
| 1 | 1 |
| 2 | 2 |
| 3 | 3 |

FIG. 4B

RECEIVE A CSI CONFIGURATION FROM A
NETWORK NODE ⏤ 501

PERFORM A CSI MEASUREMENT BASED
ON THE CSI CONFIGURATION ⏤ 502

DETERMINE ASSISTANCE INFORMATION
COMPRISING A PERIODICITY FOR A NEXT
CSI CONFIGURATION FROM THE
NETWORK BASED ON THE CSI
MEASUREMENT ⏤ 503

TRANSMIT THE ASSISTANCE
INFORMATION TO THE NETWORK NODE ⏤ 504

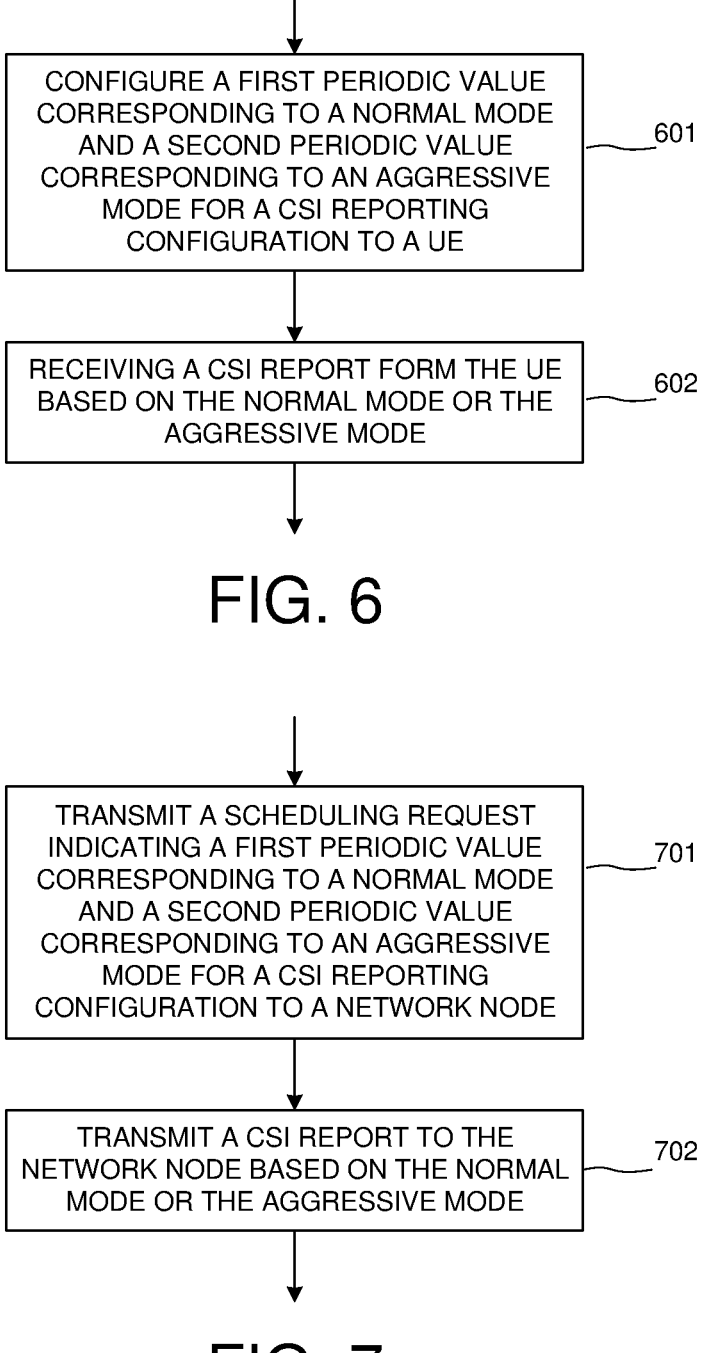

CONFIGURE A FIRST PERIODIC VALUE CORRESPONDING TO A NORMAL MODE AND A SECOND PERIODIC VALUE CORRESPONDING TO AN AGGRESSIVE MODE FOR A CSI REPORTING CONFIGURATION TO A UE — 601

RECEIVING A CSI REPORT FORM THE UE BASED ON THE NORMAL MODE OR THE AGGRESSIVE MODE — 602

FIG. 6

TRANSMIT A SCHEDULING REQUEST INDICATING A FIRST PERIODIC VALUE CORRESPONDING TO A NORMAL MODE AND A SECOND PERIODIC VALUE CORRESPONDING TO AN AGGRESSIVE MODE FOR A CSI REPORTING CONFIGURATION TO A NETWORK NODE — 701

TRANSMIT A CSI REPORT TO THE NETWORK NODE BASED ON THE NORMAL MODE OR THE AGGRESSIVE MODE — 702

FIG. 7

APPARATUS AND METHOD FOR ASSISTANCE INFORMATION TRANSMISSION AND CSI REPORTING

CROSS REFERENCE TO RELATED APPLICATIONS

This application claims priority under 35 U.S.C. § 119 from U.S. Provisional Application No. 63/254,602, entitled "Enhancement of CSI Framework with UE Assistance and Finer Control", filed on Oct. 12, 2021, the subject matter of which is incorporated herein by reference.

TECHNICAL FIELD

The disclosed embodiments relate generally to wireless communication, and, more particularly, to assistance information for channel state information (CSI) and CSI reporting.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board, has decided to focus the future NGMN activities on defining the end-to-end requirements for 5G new radio (NR) systems.

In conventional 5G technology, the periodicity of periodic and semi-persistent CSI measurement and CSI reporting is determined and configured by gNB. It is challenging for gNB to acquire full channel information as it requires huge UL signaling overhead and compression loss is inevitable due to discretization.

In addition, in conventional 5G technology, UE may know better which configuration is more suitable for the current channel condition based on the result of CSI measurement. For example, if the channel variation is faster than what the current configuration can afford, more frequent CSI measurement and reporting is needed to avoid performance degradation. By contrast, if the channel variation is slower than what the current configuration can support, less frequent CSI measurement and reporting can help save the signaling overhead. Therefore, since the UE can know better which configuration is more suitable for the current channel condition, how can the UE assist gNB in determining a suitable CSI configuration is worthy of discussion.

SUMMARY

Apparatus and method for assistance information transmission and CSI reporting are proposed. The network node may allocate channel state information (CSI) configuration for the UE and transmit the CSI configuration to the UE. The UE may perform CSI measurement based on the CSI configuration from the network node, determine the assistance information based on the CSI measurement result, and transmit the assistance information the network node to improve the downlink (DL) throughput and save the signaling overhead of CSI measurement or CSI reporting.

In one embodiment, a user equipment (UE) receives a channel state information (CSI) configuration from a network node. The UE performs a CSI measurement based on the CSI configuration. The UE determines assistance information based on the CSI measurement, wherein the assistance information comprises a periodicity for a next CSI configuration from the network node. The UE transmits the assistance information to the network node.

In another embodiment, a network node configures a first periodic value and a second periodic value for a channel state information (CSI) reporting configuration to a user equipment (UE). The first periodic value corresponds to a normal mode and the second periodic value corresponds to an aggressive mode, and the first periodic value is larger than the second periodic value. In addition, the network node receives a CSI report from the UE based on the normal mode or the aggressive mode.

In another embodiment, a user equipment (UE) transmits a scheduling request indicating a first periodic value and a second periodic value for a channel state information (CSI) reporting configuration to a network node. The first periodic value corresponds to a normal mode and the second periodic value corresponds to an aggressive mode, and the first periodic value is larger than the second periodic value. In addition, the UE transmits a CSI report to the network node based on the normal mode or the aggressive mode.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4A is a schematic diagram of a CSI confidence indicator in accordance with one novel aspect.

FIG. 4B is a schematic diagram of a CSI confidence indicator in accordance with another novel aspect.

FIG. 6 is a flow chart of a CSI reporting method in accordance with one novel aspect.

FIG. 7 is a flow chart of a CSI reporting method in accordance with another novel aspect.

DETAILED DESCRIPTION

Reference will now be made in detail to some embodiments of the invention, examples of which are illustrated in the accompanying drawings.

Figure 1:
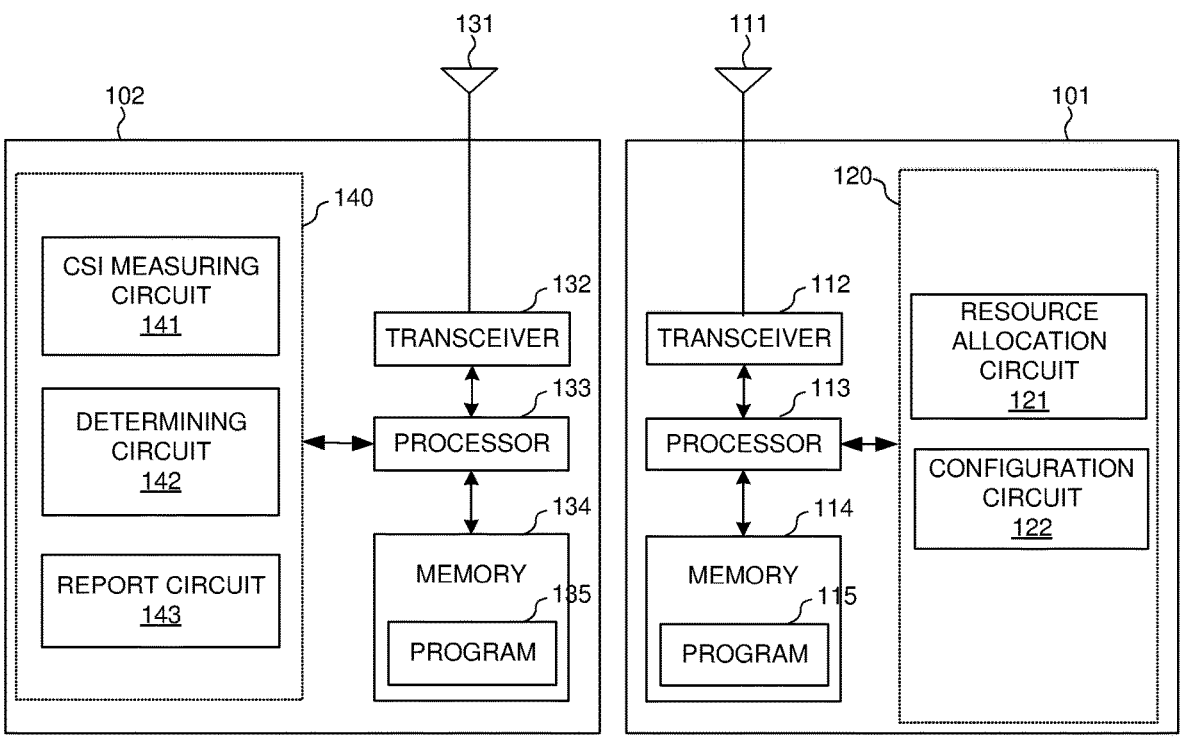
FIG. 1 is a simplified block diagram of a network node and a user equipment that carry out certain embodiments of the present invention.

FIG. 1 is a simplified block diagram of a network node and a user equipment (UE) that carry out certain embodiments of the present invention. The network node 101 may be a base station (BS) or a gNB, but the present invention should not be limited thereto. The UE 102 may be a smart phone, a wearable device, an Internet of Things (IoT) device, and a tablet, etc. Alternatively, UE 102 may be a Notebook (NB) or Personal Computer (PC) inserted or installed with a data card which includes a modem and RF transceiver(s) to provide the functionality of wireless communication.

Network node 101 has an antenna array 111 having multiple antenna elements that transmits and receives radio signals, one or more RF transceiver modules 112, coupled with the antenna array 111, receives RF signals from antenna array 111, converts them to baseband signal, and sends them to processor 113. RF transceiver 112 also converts received baseband signals from processor 113, converts them to RF signals, and sends out to antenna array 111. Processor 113 processes the received baseband signals and invokes different functional modules 120 to perform features in network node 101. Memory 114 stores program instructions and data 115 to control the operations of network node 101. Network node 101 also includes multiple function modules that carry out different tasks in accordance with embodiments of the current invention.

Similarly, UE 102 has an antenna array 131, which transmits and receives radio signals. A RF transceiver 132, coupled with the antenna, receives RF signals from antenna array 131, converts them to baseband signals and sends them to processor 133. RF transceiver 132 also converts received baseband signals from processor 133, converts them to RF signals, and sends out to antenna array 131. Processor 133 processes the received baseband signals and invokes different functional modules 140 to perform features in UE 102. Memory 134 stores program instructions and data 135 to control the operations of UE 102. UE 102 also includes multiple function modules and circuits that carry out different tasks in accordance with embodiments of the current invention.

The functional modules and circuits 120 and 140 can be implemented and configured by hardware, firmware, software, and any combination thereof. The function modules and circuits 120 and 140, when executed by the processors 113 and 133 (e.g., via executing program codes 115 and 135), allow network node 101 and UE 102 to perform embodiments of the present invention.

In the example of FIG. 1, the network node 101 may comprise a resource allocation circuit 121 and a configuration circuit 122. Resource allocation circuit 121 may allocate channel state information (CSI) configuration for the UE 102. Configuration circuit 122 may transmit the CSI configuration to the UE 102.

In the example of FIG. 1, the UE 102 may comprise a CSI measuring circuit 141, a determining circuit 142 and a report circuit 143. CSI measuring circuit 141 may perform CSI measurement based on the CSI configuration from the network node 101. Determining circuit 142 may determine the assistance information and CSI report based on the CSI measurement result of the CSI measuring circuit 141. Report circuit 143 may transmit the assistance information and the CSI report the network node 101.

In accordance with one novel aspect, the UE 102 may receive the channel state information (CSI) configuration from the network node 101. The CSI configuration may comprise a CSI-reference signal (CSI-RS), wherein the CSI-RS may be periodic or semi-persistent. In an embodiment, the CSI-RS is configured for a channel measurement. In another embodiment, the CSI-RS is configured for an interference measurement. In addition, in an embodiment, the CSI-RS may be CSI-interference measurement (CSI-IM) for measuring interference between inter-cells.

The UE 102 may perform CSI measurement based on the CSI configuration from the network node 101. Then, the UE 102 may determine the assistance information based on the result of the CSI measurement. The UE 102 may transmit the assistance information to the network node 101. In an embodiment, the UE 102 may transmit the assistance information to the network node 101 through a Medium Access Control-Control Element (MAC-CE) on a Physical Uplink Shared Channel (PUSCH). In an embodiment, the network node 101 may determine a limit condition to restrict the number of transmitting the assistance information or restrict a time duration of transmitting the assistance information. The limit condition may be configured to the UE 102 by the network 101 or pre-set in the UE 102. The UE 102 may restrict the number of transmitting the assistance information or restrict a time duration of transmitting the assistance information based on the limitation condition from the network 101. In an example, the limit condition may indicate that a limited number of MAC-CEs can be sent within a period. In another example, the limit condition may indicate that when the UE 102 has transmitted an MAC-CE with assistance information to the network node 101, the UE 102 cannot transmit another or next MAC-CE with assistance information to the network node 101 within a time duration. In another embodiment, the UE 102 may be configured a timer. When the UE 102 transmits an MAC-CE with assistance information to the network node 101, the timer will be enabled. The UE 102 cannot transmit another or next MAC-CE with assistance information to the network node 101 before the timer expires.

In accordance with one novel aspect, the assistance information may comprise a periodicity for a next CSI configuration from the network node 101. In an example, the UE 102 may inform the network node 101 the desired periodicity for the CSI-RS for channel measurement or for the CSI-RS for interference measurement, and the network node 101 may transmit the next CSI-RS based on the periodicity informed by the UE 102. The desired periodicity for the CSI-RS for channel measurement and the desired periodicity for the CSI-RS for interference measurement may be the same or different. In an embodiment, the network 101 may pre-configure a list to the UE 102 and the UE 102 may determine its desired periodicity from the list. For example, the list may comprise {4, 5, 8, 10, 16, 20, 32, 40, 64, 80, 160, 320, 640} (slots), and the UE 102 may select a desired periodicity from the list.

In another embodiment, the network 101 may pre-configure a bit map to the UE 102 and the UE 102 may determine its desired periodicity from the bit map. For example, the bit map may comprise four codepoints 0, 1, 2 and 3, wherein the codepoint "0" indicates that the length of periodicity is smaller than 10 slots, the codepoint "1" indicates that the length of periodicity is 10 slots, the codepoint "2" indicates that the length of periodicity is 20 slots and the codepoint "3" indicates that the length of periodicity is larger than 20 slots. The UE 102 may determine its desired periodicity based on the bit map.

In accordance with one novel aspect, the assistance information further comprises at least one of Doppler information, bandwidth configuration, delay information, and frequency of CSI reporting.

The Doppler information may comprise average Doppler shift, maximum Doppler shift or Doppler spread. The network node 101 may determine whether to update the periodicity based on the Doppler information from the UE 102.

The bandwidth configuration may indicate that the desired bandwidth configuration of the UE 102 is wideband or sub-band. In addition, the bandwidth configuration may further comprise the sub-band size. In an embodiment, the network 101 may pre-configure a list to the UE 102 and the UE 102 may determine its desired bandwidth configuration from the list. In another embodiment, the network 101 may pre-configure a bit map to the UE 102, and the UE 102 may determine its desired bandwidth configuration from the bit map.

The delay information may comprise average delay shift, maximum delay shift or delay spread. The network node 101 may determine whether to update the bandwidth configuration based on the delay information from the UE 102.

In accordance with one novel aspect, the UE 102 may transmit a scheduling request on a Physical Uplink Control Channel (PUCCH) to the network node 101 to request an aperiodic CSI measurement or an aperiodic CSI reporting. In an example, the scheduling request for the aperiodic CSI measurement may comprise at least one of a duration and a gap for an aperiodic CSI-RS resource burst. In an embodiment, the UE 102 may further transmit the scheduling request to the network node 101 to request changing the periodicity for a CSI resource or reporting configuration for a short period of time.

In an embodiment, the UE 102 may transmit the scheduling request for the aperiodic CSI measurement to the network node 101 in an event that an average Signal-to-Interference-plus-Noise-Ratio (SINR) of Doppler spectrum at boundaries is larger than a threshold. For example, when X % Doppler spectrum is at boundaries and the average SINR of X % Doppler spectrum at boundaries is larger than a threshold, the UE 102 may transmit the scheduling request for the aperiodic CSI measurement to the network 101, wherein X and the threshold may be pre-determined in the UE 102 or configured by the network node 101.

In another embodiment, the UE 102 may transmit the scheduling request for the aperiodic CSI reporting to the network node 101 in an event that more than a proportion of throughput can be gained or increased by updating CSI. For example, when more than X % throughput can be gained by updating CSI, the UE 102 may transmit the scheduling request for the aperiodic CSI reporting to the network node 101 to update CSI, wherein X may be pre-determined in the UE 102 or configured by the network node 101.

In accordance with one novel aspect, the network node 101 may configure a first periodic value and a second periodic value for a channel state information (CSI) reporting configuration to the UE 102. The network node 101 may receive a CSI report from the UE 102 based on the normal mode or the aggressive mode. The first periodic value may correspond a normal mode and the second periodic value may correspond to an aggressive mode, and the first periodic value is larger than the second periodic value.

In accordance with another novel aspect, the UE 102 may transmit a scheduling request indicating a first periodic value and a second periodic value for a CSI reporting configuration to a network node. Then, the UE 102 may transmit a CSI report to the network node 101 based on the normal mode or the aggressive mode. The first periodic value corresponds a normal mode and the second periodic value corresponds to an aggressive mode, and the first periodic value is larger than the second periodic value.

In the invention, the normal mode means that the network node 101 can receive the CSI report with full information (e.g., complete information or all parameters) from the UE 102 based on the first periodic value or the UE 102 can transmit the CSI report with full information (e.g., complete information or all parameters) to the network node 101 based on the first periodic value. The aggressive mode means that the network node 101 can receive the CSI report with partial information (e.g., difference information or partial parameters) from the UE 102 based on the second periodic value or the UE 102 can transmit the CSI report with partial information (e.g., difference information or partial parameters) to the network node 101 based on the second periodic value.

Figure 2A:
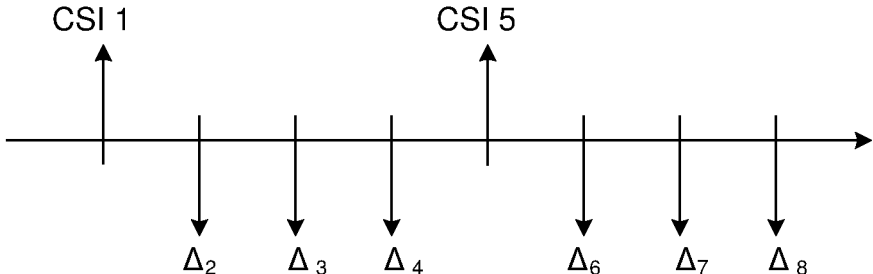
FIG. 2A is a schematic diagram of a differential CSI reporting in accordance with one novel aspect.

In an embodiment, the UE 102 may transmit the CSI report with complete information in the normal mode and transmit the CSI report with difference information between the CSI report and a prior CSI report in the aggressive mode. The difference information means that the difference between a CSI report and prior CSI report. Taking FIG. 2A as an example, the UE 102 may transmit the CSI report with complete information (e.g., CSI 1 and CSI 5) every four time units (i.e., the first periodic value is four time units). Otherwise, the UE 102 may transmit the CSI report with difference information (e.g., CSI 2 with difference information $\Delta_2$, CSI 3 with difference information $\Delta_3$, CSI 4 with difference information $\Delta_4$, CSI 6 with difference information $\Delta_6$, CSI 7 with difference information $\Delta_7$ and CSI 8 with difference information $\Delta_8$) every one time unit (i.e., the second periodic value is one time unit), wherein the difference information $\Delta_2$ means the difference between the CSI report CSI 1 and CSI report CSI 2, the difference information $\Delta_3$ means the difference between the CSI report CSI 2 and CSI report CSI 3, the difference information $\Delta_4$ means the difference between the CSI report CSI 3 and CSI report CSI 4, the difference information $\Delta_6$ means the difference between the CSI report CSI 5 and CSI report CSI 6, the difference information $\Delta_7$ means the difference between the CSI report CSI 6 and CSI report CSI 7 and the difference information $\Delta_8$ means the difference between the CSI report CSI 7 and CSI report CSI 8.

Figure 3A:
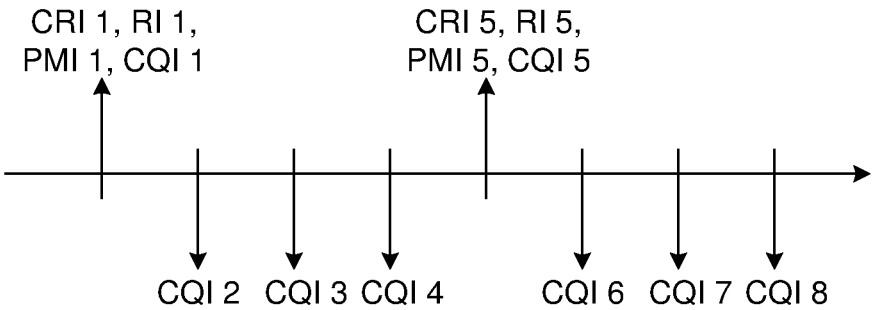
FIG. 3A is a schematic diagram of a subset CSI reporting in accordance with one novel aspect.

In another embodiment, the UE 102 may transmit the CSI report with all parameters in the normal mode and transmit the CSI report with partial parameters in the aggressive mode. For example, each CSI report may comprise the parameters, CSI-RS Resource Indicator (CRI), Rank Indicator (RI), Precoding Matrix Indicator (PMI) and Channel Quality Indicator (CQI). When the UE 102 only needs to transmit the CSI report with partial parameters, the UE 102 may transmit the CSI report only comprising CQI. Taking FIG. 3A as an example, the UE 102 may transmit the CSI report with all parameters (e.g., CSI 1 comprising CRI1, RI 1, PMI 1 and CQI 1 and CSI 5 comprising CRI5, RI 5, PMI 5 and CQI 5) every four time units (i.e., the first periodic value is four time units). Otherwise, the UE 102 may transmit the CSI report with partial parameters (e.g., CSI 2 only comprising CQI 2, CSI 3 only comprising CQI 3, CSI 4 only comprising CQI 4, CSI 6 only comprising CQI 6, CSI 7 only comprising CQI 7 and CSI 8 only comprising CQI 8) every one time unit (i.e., the second periodic value is one time unit).

In accordance with a novel aspect, the network node 101 may configure that the UE 102 needs to transmit the CSI report with full information (e.g., complete information or all parameters) aperiodically. When the CSI report with full information is not triggered by the network node 101, the UE 102 may transmit the CSI report with partial information (e.g., difference information or partial parameters) to the network node 101.

In accordance with another novel aspect, the UE 102 may aperiodically transmit a scheduling request indicating whether to transmit the CSI report with full information (e.g., complete information or all parameters). When the CSI report with full information is not indicated by the UE 102, the UE 102 may transmit the CSI report with partial information (e.g., difference information or partial parameters) to the network node 101.

Figure 2B:
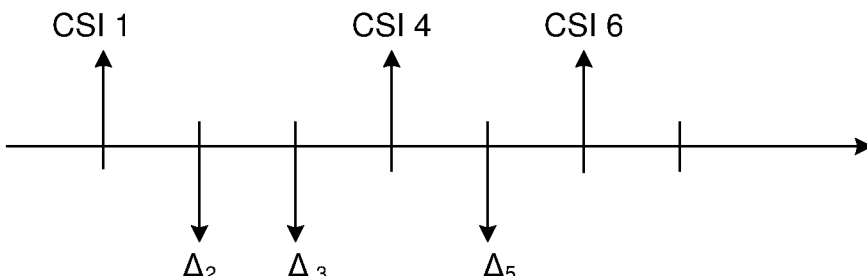
FIG. 2B is a schematic diagram of a differential CSI reporting in accordance with another novel aspect.

In an embodiment, the UE 102 may transmit an aperiodic CSI report with difference information based on a latest CSI report. Taking FIG. 2B as an example, the UE 102 may transmit the CSI report CSI 1 with complete information, the CSI report CSI 4 with complete information and the CSI report CSI 6 with complete information. In addition, the UE 102 may transmit the CSI report CSI 2 with difference information $\Delta_2$ based on the CSI report CSI 1, the UE 102 may transmit the CSI report CSI 3 with difference information $\Delta_3$ based on the CSI report CSI 2, and the UE 102 may transmit the CSI report CSI 5 with difference information $\Delta_5$ based on the CSI report CSI 4.

Figure 3B:
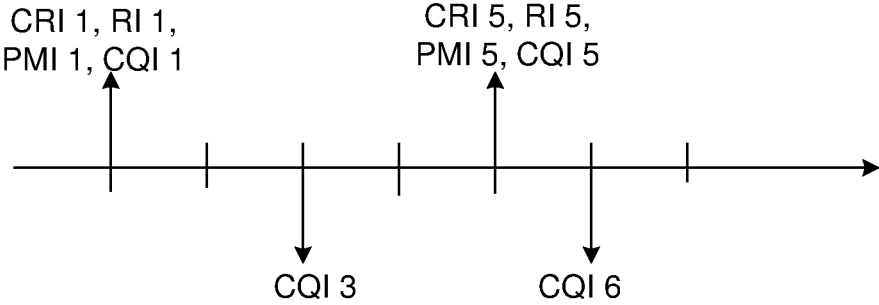
FIG. 3B is a schematic diagram of a subset CSI reporting in accordance with another novel aspect.

In an embodiment, the UE 102 may transmit an aperiodic CSI report with partial parameters based on a latest CSI report. Taking FIG. 3B as an example, the UE 102 may transmit the CSI report CSI 1 comprising CRI1, RI 1, PMI 1 and CQI 1 and the CSI report CSI 5 comprising CRI5, RI 5, PMI 5 and CQI 5. In addition, the UE 102 may transmit the CSI report CSI 3 only comprising CQI 3 based on the CSI report CSI 1 and the UE 102 may transmit the CSI report CSI 6 only comprising CQI 6 based on the CSI report CSI 5.

Accordingly, in the invention, when the CSI varies smoothly over time, the UE 102 may transmit the CSI report flexibly without needing to transmit all CSI reports with complete information.

In accordance with a novel aspect, the network node 101 may receive the CSI report with a CSI confidence indicator from the UE 102.

In an embodiment, the CSI confidence indicator consists of one bit, wherein in an event that the bit is a first value, the CSI confidence indicator indicates the CSI report is confident, and in another event that the bit is a second value, the CSI confidence indicator indicates the CSI report is not confident. The UE 102 may determine the CSI confidence indicator based on a bit map. Taking FIG. 4A as an example, when the bit of CSI confidence indicator is "0", the CSI confidence indicator may indicate the CSI report is confident, and when the bit of CSI confidence indicator is "1", the CSI confidence indicator may indicate the CSI report is not confident.

In another embodiment, the CSI confidence indicator consists of one bit selected from a plurality of bits by the UE 102, wherein each bit corresponds to a corresponding confidence level. The UE 102 may determine the CSI confidence indicator based on a bit map. Taking FIG. 4B as an example, when the bit of CSI confidence indicator is "0", the CSI confidence indicator may indicate confidence level is "0", when the bit of CSI confidence indicator is "1", the CSI confidence indicator may indicate confidence level is "1", when the bit of CSI confidence indicator is "2", the CSI confidence indicator may indicate confidence level is "2" and when the bit of CSI confidence indicator is "3", the CSI confidence indicator may indicate confidence level is "3".

Figure 5:
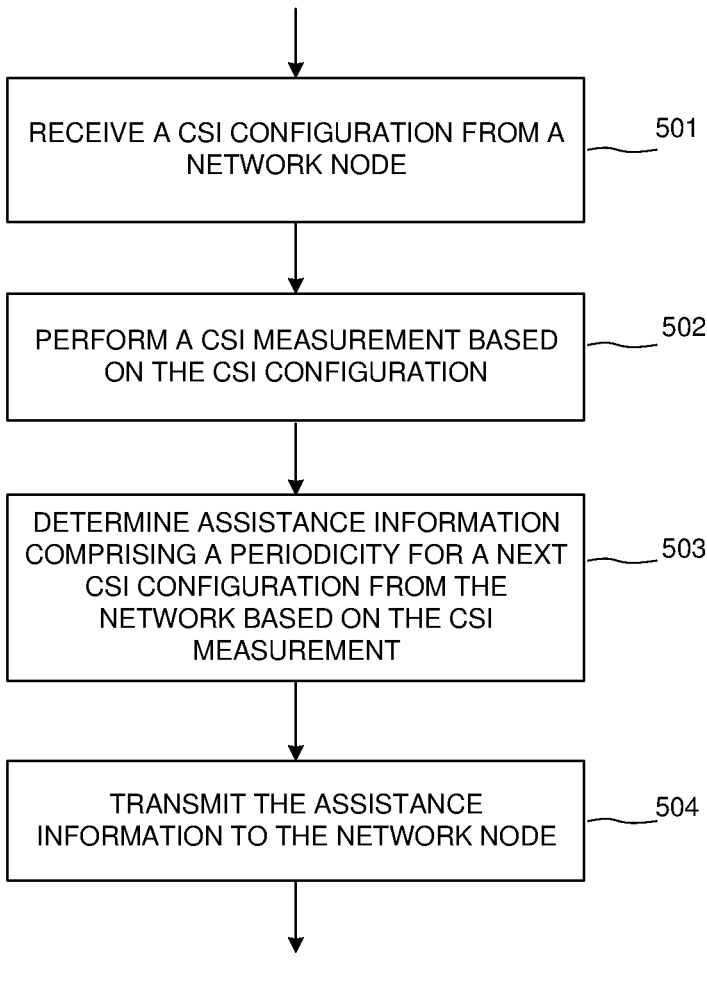
FIG. 5 is a flow chart of an assistance information transmission method in accordance with one novel aspect.

FIG. 5 is a flow chart of an assistance information transmission method in accordance with one novel aspect. In step 501, the UE 102 receives a channel state information (CSI) configuration from the network node 101.

In step 502, the UE 102 performs a CSI measurement based on the CSI configuration.

In step 503, the UE 102 determines the assistance information based on the CSI measurement, wherein the assistance information comprises a periodicity for a next CSI configuration from the network node 101.

In step 504, the UE 102 transmits the assistance information to the network node 101.

In the assistance information transmission method, the assistance information may be transmitted to the network node through a Medium Access Control-Control Element (MAC-CE) on a Physical Uplink Shared Channel (PUSCH).

In the assistance information transmission method, the assistance information further comprises at least one of Doppler information, bandwidth configuration, delay information, and frequency of CSI reporting.

FIG. 6 is a flow chart of a CSI reporting method in accordance with one novel aspect. In step 601, the network node 101 configures a first periodic value and a second periodic value for a channel state information (CSI) reporting configuration to the UE 102, wherein the first periodic value corresponds a normal mode and the second periodic value corresponds to an aggressive mode, and the first periodic value is larger than the second periodic value.

In step 602, the network node 101 receives a CSI report from the UE based on the normal mode or the aggressive mode.

FIG. 7 is a flow chart of a CSI reporting method in accordance with another novel aspect. In step 701, the UE 102 transmits a scheduling request indicating a first periodic value and a second periodic value for a channel state information (CSI) reporting configuration to the network node 101, wherein the first periodic value corresponds a normal mode and the second periodic value corresponds to an aggressive mode, and the first periodic value is larger than the second periodic value.

In step 702, the UE 102 transmits a CSI report to the network node 101 based on the normal mode or the aggressive mode.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving, by a user equipment (UE), a channel state information (CSI) configuration from a network node;
performing, by the UE, a CSI measurement based on the CSI configuration;
determining, by the UE, assistance information based on the CSI measurement, wherein the assistance information comprises a periodicity for a next CSI configuration from the network node; and
transmitting, by the UE, the assistance information to the network node; and
transmitting, by the UE, a scheduling request on a Physical Uplink Control Channel (PUCCH) to the network node to request an aperiodic CSI measurement or an aperiodic CSI reporting.

2. The method of claim 1, wherein the transmission comprises transmitting the assistance information to the network node through a Medium Access Control-Control Element (MAC-CE) on a Physical Uplink Shared Channel (PUSCH).

3. The method of claim 1, further comprising: determining, by the UE, the periodicity from a list configured by the network node.

4. The method of claim 1, further comprising:

receiving, by the UE, a limit condition from the network node to restrict the number of transmitting the assistance information or restrict a time duration of transmitting the assistance information.

5. The method of claim 1, wherein the CSI configuration comprises a CSI-reference signal (CSI-RS), wherein the CSI-RS is periodic or semi-persistent.

6. The method of claim 5, wherein the CSI-RS is for a channel measurement or for an interference measurement.

7. The method of claim 5, wherein the CSI-RS is CSI-interference measurement (CSI-IM).

8. The method of claim 1, wherein the assistance information further comprises at least one of Doppler information, bandwidth configuration, delay information, and frequency of CSI reporting.

9. The method of claim 1, wherein the UE transmits the scheduling request for the aperiodic CSI measurement in an event that an average Signal-to-Interference-plus-Noise-Ratio (SINR) of Doppler spectrum at boundaries is larger than a threshold.

10. The method of claim 1, wherein the UE transmits the scheduling request for the aperiodic CSI reporting in an event that more than a proportion of throughput is gained by updating CSI.

11. The method of claim 1, wherein the scheduling request for the aperiodic CSI measurement comprises at least one of a duration and a gap for an aperiodic CSI-RS resource burst.

12. A method, comprising:

configuring, by a network node, a first periodic value and a second periodic value for a channel state information (CSI) reporting configuration to a user equipment (UE), wherein the first periodic value corresponds to a normal mode and the second periodic value corresponds to an aggressive mode, and wherein the first periodic value is larger than the second periodic value;

receiving, by the network node, a scheduling request from the UE for activating the normal mode or the aggressive mode; and receiving, by the network node, a CSI report from the UE based on the normal mode or the aggressive mode.

13. The method of claim 12, further comprising:

receiving, by the network node, the CSI report with complete information in the normal mode; and receiving, by the network node, the CSI report with difference information between the CSI report and a prior CSI report in the aggressive mode.

14. The method of claim 12, further comprising:

receiving, by the network node, the CSI report with all parameters in the normal mode; and receiving, by the network node, the CSI report with partial parameters in the aggressive mode.

15. The method of claim 12, further comprising:

receiving, by the network node, an aperiodic CSI report based on a latest CSI report.

16. A method, comprising:

transmitting, by a user equipment (UE), a scheduling request indicating a first periodic value and a second periodic value for a channel state information (CSI) reporting configuration to a network node, wherein the first periodic value corresponds to a normal mode and the second periodic value corresponds to an aggressive mode, and wherein the first periodic value is larger than the second periodic value; and transmitting, by the UE, a CSI report to the network node based on the normal mode or the aggressive mode.

17. The method of claim 16, further comprising:

transmitting, by the UE, the CSI report with complete information in the normal mode; and transmitting, by the UE, the CSI report with difference information between the CSI report and a prior CSI report in the aggressive mode.

18. The method of claim 16, further comprising:

transmitting, by the UE, the CSI report with all parameters in the normal mode; and transmitting, by the UE, the CSI report with partial parameters in the aggressive mode.

19. The method of claim 16, further comprising:

transmitting, by the UE, an aperiodic CSI report based on a latest CSI report.

* * * * *